United States Patent
Toh et al.

(10) Patent No.: US 6,811,830 B2
(45) Date of Patent: Nov. 2, 2004

(54) PHOTOCHROMIC ARTICLE AND METHOD OF PREPARATION

(75) Inventors: Huan Kiak Toh, Fullarton (AU); David Andrew Lewis, Marion (AU); Raymond K. Bubner, Clarence Gardens (AU); Bohdan Grzegorz Gieslinski, Hallett Cove (AU); Fang Chen, Hallett Cove (AU)

(73) Assignee: Sola International Holdings, Ltd., Lonsdale (AU)

( * ) Notice: Subject to any disclaimer, the term of this patent is extended or adjusted under 35 U.S.C. 154(b) by 10 days.

(21) Appl. No.: 10/239,219

(22) PCT Filed: Apr. 2, 2001

(86) PCT No.: PCT/AU01/00372

§ 371 (c)(1),
(2), (4) Date: Sep. 20, 2002

(87) PCT Pub. No.: WO01/72851

PCT Pub. Date: Oct. 4, 2001

(65) Prior Publication Data

US 2003/0043447 A1 Mar. 6, 2003

(30) Foreign Application Priority Data

Mar. 31, 2000 (AU) ............................................. PQ 6623

(51) Int. Cl.$^7$ .................................................. C08F 2/46
(52) U.S. Cl. ........................ 427/517; 427/508; 427/162; 427/402; 427/407.1; 522/6; 522/24; 522/150; 522/153; 522/157; 522/163; 522/178; 522/181; 522/182; 264/1.7; 264/1.32; 264/1.36; 264/1.38; 264/1.8; 264/2.6; 264/496; 252/582; 252/583; 252/586
(58) Field of Search ............................. 522/6, 24, 150, 522/153, 157, 160, 178, 181, 182; 427/508, 517, 162, 402, 407.1; 264/1.7, 1.32, 1.36, 1.38, 1.8, 2.6, 496; 252/582, 583, 586

(56) References Cited

U.S. PATENT DOCUMENTS 5,531,940 A * 7/1996 Gupta et al. .................. 264/1.7
5,882,556 A * 3/1999 Perrott et al. ............... 264/1.38

FOREIGN PATENT DOCUMENTS

| JP | 62010629 | 1/1987 |
| JP | 89-142002/19 | 3/1989 |
| JP | 1204902 | 8/1989 |
| JP | 1204975 | 8/1989 |
| JP | 91-004400/01 | 11/1990 |
| JP | 4208919 | 7/1992 |
| JP | 93-089389 | 2/1993 |
| JP | 94-291011/36 | 8/1994 |
| JP | 98-059197/06 | 11/1997 |
| RU | 98-296114/26 | 11/1997 |
| WO | WO 95/15845 | 6/1995 |
| WO | WO 96/18921 | 6/1996 |
| WO | WO 98/03890 | 1/1998 |

* cited by examiner

*Primary Examiner*—James J. Seidleck
*Assistant Examiner*—Sanza L. McClendon
(74) *Attorney, Agent, or Firm*—Burns, Doane, Swecker & Mathis, LLP

(57) ABSTRACT

A process for manufacture of a photochromic polymeric article comprising: providing a fluid polymerisable composition; subjecting the fluid polymerisable composition to a first curing step to provide a solid article of intermediate hardness; contacting the solid article of intermediate hardness with a photochromic substance; and subjecting the solid article of intermediate hardness to a further curing step to increase the hardness and provide a polymeric article imbibed with the photochromic substance.

23 Claims, 1 Drawing Sheet

Fade Half Life Versus Activation Half Life

Activation Half Life Versus INITIAL Barcol

PHOTOCHROMIC ARTICLE AND METHOD OF PREPARATION

This application is a 371 of PCT/AV01/00372 filed Apr. 2, 2001.

The present invention relates to photochromic articles including optical articles such as sunglasses, spectacles and piano lenses, windows, vehicle and aircraft transparencies, plastic film and coating. The present invention relates in particular to photochromic articles and to preparation thereof from organic polymerisable compositions.

Photochromic articles contain a photochromic dye which undergoes a reversible colour change when exposed to light of a certain wavelength particularly in the UV and visible ranges of the electromagnetic spectrum. The classes of known photochromic dyes include naphthopyrans and fulgides, spirooxazine chromenes and others.

Photochromic articles may be prepared by imbibing a transparent polymeric articles with a photochromic substance such as described in U.S. Pat. Nos. 4,286,957 and 5,130,353 or by casting the lens with an incorporated photochromic material as described in U.S. Pat. No. 4,851,471.

One problem of photochromic articles which has hindered their widespread acceptance is fatigue. Repeated exposure to light causes photochromic articles to exhibit reduced photochromic properties. Also customers who use photochromic articles particularly sunglasses prefer that the development of colour (activation) is rapid when the article is exposed to direct sun light and that the reverse process (fade) is also relatively rapid on moving from sunlight.

We have now found that the activation and fade properties are improved if the photochromic dye is incorporated into an optical article at an intermediate stage in the curing process.

Accordingly we provide a process for manufacture of a photochromic polymeric article comprising
  providing a fluid polymerisable composition;
  subjecting the fluid polymerisable composition to a first curing step to provide a solid article of intermediate hardness;
  contacting the solid article of intermediate hardness with a photochromic substance; and
  subjecting the solid article of intermediate harness to a further curing step to increase the hardness and provide a polymeric article imbibed with the photochromic substance.

The process of the invention includes partly curing a fluid polymerisable composition to form a solid article. The process may and generally will include casting of the fluid polymerisable composition using a suitable mould. The photochromic article is typically a shaped article such as a sheet, film or lens. Alternatively, though less, preferably the process may involve applying the polymerisable composition as a coating or shaping it by other means such as extrusion or other suitable methods.

The degree of curing which takes place prior to contacting the solid article with a photochromic substance will depend on the compound, the type of article and its intended application. The first curing step will generally provide a solid shaped article which preferably has sufficient integrity to allow it to maintain its shape during treatment with the photochromic substance. Where the article is cast using a mould it is preferred that the fast curing step provide sufficient hardness to allow it to be removed from the mould without being deformed. The hardness of the intermediate product will typically be governed by the mechanical handling required to prepare the article for contact with the photochromic substance and second curing stage. The final hardness will depend on the intended use of the product. In the case of lens materials the photochromic article will typically be cured to allow the lens to be worked for example by cutting and polishing for use in spectacles or other optical applications.

The first and second curing steps may be conducted by thermal curing, radiation curing or a combination thereof. The method of carrying out the first curing step on further curing step may be chosen to ensure that the first curing step does not activate full cure.

In a particularly preferred embodiment the second curing step comprises thermal curing of the polymeric composition. In this embodiment the polymerisable composition will typically include thermal polymerisation initiator and the composition is heated to a temperature to provide curing in the presence of the thermal polymerisation initiator. The further curing step will typically also be at a temperature which provides inbibition of the photochromic substance.

The extent of polymerisation which occurs before incorporating the photochromic material may be measured by the percentage of double bond conversion. The change in percentage conversion of the fluid polymerisable composition between the article of intermediate hardness and photochromic article (ie the change brought about by the further curing step) is typically in the range of from 5 to 30% and preferably 10 to 20%. The photochromic material is most preferably incorporated into a polymer having a double bond conversion of from 70 to 85% (preferably 77 to 83%) and the further curing provides a double bond conversion of at least 88% preferably at least 90% more preferably 92% and most preferably from 92 to 94%.

There are a number of known curing methods which may be used to effect the first curing step and further curing step. The appropriate technique may depend on the components of the polymerisable composition and the required properties. Radiation polymerisation, for example by electron beam, or ultraviolet radiation may be used. Where curing is produced by ultraviolet radiation the composition may include one or more compounds for initiating polymerisation in the presence of UV light or otherwise sensitising the composition to produce initiation in UV light. Preferably the first curing step involves radiation curing and the further curing step is by thermally initiated polymerisation.

Accordingly in a particularly preferred embodiment of the invention the fluid polymerisable composition is a photopolymer composition further comprising a thermal polymerisation initiator and the first curing step includes subjecting the fluid polymerisable composition to radiation curing and the further curing step comprises heating the article of intermediate hardness to temperature sufficient to provide thermal polymerisation in the presence of said thermal polymerisation initiator.

The further polymerisation step is preferably conducted at a temperature in the range of from 100 to 180° C. and more preferably in the range of from 120 to 150° C. The further curing step may include heating the article of intermediate hardness to a temperature of 80 to 120° C. to more fully react any photo-generated radials and then increasing the temperature to about 135° C. to provide thermal polymerisation.

Examples of UV initiators which may be used in the preferred embodiment include benzophenone, benzoin ethers, dimethoxy-α-phenylacetophenone, diethoxyacetophenone, α-hydroxy-α,α-dialkylacetophenones, acylphosphine oxides, salts of organic carboxylates and sulfonates, cyclic photoinitiators such as cyclic benzoin ethers and benzil ketones, Michlers ketones, ketocoumarins and combinations thereof. The preferred photoinitiators photosensitisers are selected from acylphosphine oxides, benzoin ethers and mixtures thereof. A specific example of preferred photoinitiators are 2,4,6-trimethylbenzoyidiphenylphosphine oxide (available under the trade name LUCIRIN TPO) and methylphenylglyoxylate (Vircure 55), bis(2,4,6-trimethylbenzoyl)-phenylphosphine oxide (Irgacure 819); 1-bis(2,6-dimethoxybenzoyl)-2,4,4-trimethylpentyl phosphine oxide and mixtures thereof.

The amount of photoinitiator used in the polymerisable composition cure system is normally less than that used to fully cure the lens composition by itself. Typically, the amount can be halved, or even less. It may be less than 0.5%. The presence of thermal initiator for the further cure step can compensate for an amount of photoinitiator less than needed to provide the desired final hardness.

In an alternative embodiment the first curing step is conducted by thermal curing at a first temperature and the further curing step is conducted at a second temperature which is higher than the first temperature.

In this embodiment the fluid polymerisable composition will typically include at least two thermal polymerisation initiators including a relatively low temperature initiator and a relatively high temperature initiator and the first curing step will include heating the composition to a temperature sufficient to activate the low temperature initiator and insufficient to provide significant initiation of the high temperature initiator and the further curing step involves heating the article to a temperature higher than the first curing step to activate the relatively high temperature initiator.

Where thermal initiators are used to provide initiation of polymerisation in each stage of the curing process they may be chosen together with the appropriate temperature for each stage, to enable a solid article of the required intermediate hardness to be isolated and contacted with the photochromic substance. For example, a first thermal initiator having a relatively short half life at a temperature in the range of 90 to 120° C. may be used together with a second thermal initiator having a relatively long half life in the range of 90 to 120° C. The second thermal initiator may for example have a 1 hour half life temperature of greater than 120° C.

Examples of thermal polymerisation initiators which may be used in the first curing step may be selected from the group consisting of azo radical initiators such as AIBN (azodiisobutyronitrile), dialkyl peroxide radical initiators such as 1,1-di-(butylperoxy-3,3,5-trimethyl cyclohexane, alkyl perester radical initiator such as TBPEH (t-butyl per-2-ethylhexanoate), diacyl peroxide radical initiator such as benzoyl peroxide, peroxy dicarbonate radical initiator such as ethyl hexyl percarbonate, ketone peroxide initiator such as methyl ethyl ketone peroxide, bis(t-butyl peroxide) diisopropylbenzene, t-butylperbenzoate, t-butyl peroxy neodecanoate a and combinations of two or more thereof.

In a more preferred embodiment the polymerisable composition contains a photoinitiator and thermal polymerisation initiator. In this embodiment the method includes partially curing the composition to a predetermined intermediate hardness by photopolymerisation in the presence of a thermal polymerisation initiator; contacting a photochromic material with the surface of the partly cured composition; and inducing thermal polymerisation during imbibition by activation of the second stage thermal polymerisation initiator to produce the hardened photochromic article.

The thermal polymerisation initiator preferably remains essentially unreacted during the photopolymerisation stage.

Photopolymerisation may be conducted in known manner by passing the composition through a photoexposure line or a number of photoexposure lines. The extent of cure may be controlled to provide the desired hardness by controlling the amount of photoinitiator together with the radiation dose.

The article of intermediate may be subject to an intermediate thermal treatment stage prior to contact with the photochromic dye. This thermal treatment may take place at the end of the first curing step or beginning of the further curing step. Where a photoinitiator is used the intermediate thermal treatment is particularly useful in reacting any remaining photogenerated radicals. The intermediate treatment stage will use a temperature less than required in the further curing step and when a thermal initiator is used in the further curing step the intermediate thermal treatment stage will generally be at a temperature less than required to actuate the initiator. Preferably the intermediate thermal treatment stage is at a temperature in the range of 80 to 120° C. and more preferably 90 to 100° C.

The photochromic material is incorporated by bringing it into contact with the surface of the substrate and subjecting it to heat to cause thermal transfer into the substrate. Heating of the substrate may and preferably will cause activation of the initiators of the thermal polymerisation process and imbibition of the photochromic substance. An example of a suitable method for incorporation of the photochromic material is described in U.S. Pat. No. 4,286,957 the contents of which are herein incorporated by reference.

A useful imbibition temperature is about 135° C., which is preferably above the glass transition temperature of the lens material, thereby promoting the diffusion process of the photochromic dye into the lens material. A typical time for this imbibition process is about 3 hours to about 6 hours. Therefore, it is desirable for the thermal initiator to NOT substantially react at about 100° C., but for it to react substantially completely over a 3 to 6 hour period at about 135° C. It is common within the industry to characterise thermal initiators by a 10 hour half life temperature, 1 hour half life temperature and 1 minute half life temperature and complete reaction is considered after about 4–8 half lives (even though initiator will still be present after this period). Hence, it is desirable to select a thermal initiator with a half life of approx. 1 hour at 135° C. Preferably the thermal initiator has 10 hours half life of more than 100° C. or in other words has a half life at 100° C. of more than 10 hours.

As can be seen from the Table below, the half life for typical high temperature thermal initiators is changed by an order of magnitude with a 20–30° C. temperature change. Hence, for an initiator with a 1 hour half life at about 136° C., as in Interox DCUP, the half life at approx. 95° C. will be 100 hours and hence it is reasonable that this initiator will not participate during the first thermal stage.

From the Table below, which shows examples of a range of high temperature thermal initiators.

|  | Temperature ° C. | | |
| --- | --- | --- | --- |
| Trade Name | 10 hour half life | 1 hour | 1 min |
| Interox TBPB | 104 | 124 | 165 |
| Interox DCUP | 116 | 136 | 175 |
| Interox DHBP | 120 | 142 | 190 |
| Interox DTBP | 125 | 146 | 190 |
| Interox CUHP-80 | 158 | 188 | 255 |

The most preferred thermal initiators for the further cure step are: t-butyl perbenzoate (Interox TBPB); dicumyl peroxide (Interox DCUP); 2,5-dimethyl hexane 2,5-di-t-butyl peroxide (Interox DHBP); di-butyl peroxide (Interox DTBP); and cumene hydroperoxide (Interox CUHP-80).

As the thermal process conditions change (for specific products), the selection of the thermal initiator will also change.

We have found that the results of the imbibition process are significantly improved if the fluid polymerisable composition includes a network modifier. Without wishing to be bound by theory we believe that the network modifier provides a more favourable network morphology which assist in maintaining the rapid photochromic response of the photochromic substance in the final cured product.

The network modifier may be selected from the group consisting of tertiary amines; chain transfer agents; allylic monomers; monounsaturated compounds and mixtures thereof.

The network modifier is generally present in an amount of no more than 10% by weight of the total composition and is most preferably selected from tertiary amines, chain transfer agents, allylic monomers and monounsaturated compounds.

Preferred amines for use as cure modifiers selected from the group consisting of N-(loweralkyl)diethanolamines, tri (loweralkyl)amines, unsaturated tertiary amines, Michael addition products of amines and monomers comprising one or more acrylate and/or methacrylate groups, hindered amine light stabilisers. Preferred chain transfer agents may be selected from mercaptans, allylics, styrene derivatives, terpinolene and mixtures thereof. A particularly preferred chain transfer agent is diphenyl-4-methyl-1-pentene available under the trade name Nofmer from Nippion oil and fats. Preferred monofunctional acrylates and/or methacrylates for use as cure modifiers include a flexible chain of at least four carbon atoms linked to an acrylate or methacrylate group.

Specific examples of commercially available amines include Q1301—from Wako, Tinuvin 765/292, Tinuvin 770 (HALS) from Ciba-Geigy, Amicure DBU, Amicure BDMA, Uvecryl 115 from Radcure and DABCO. Typically levels from 0.01% to 0.5% and preferably 0.02% to 0.1% by weight. The preferred lower alkyl group in these compounds are $C_1$ to $C_4$ alkyl.

The photopolymer composition used in the preparation of the partially cured article may be chosen from a range of compositions.

The polymerisable monomer may be selected from any suitable type, e.g. methacrylates, acrylates, vinyls, vinyl ethers, allylic, aromatic olefins, ethers, polythiols, epoxies and the like and mixtures thereof.

A diarylate or dimethacrylate monomer is preferred. The diacrylate or dimethacrylate monomer may be a polyoxyalkylene glycol diacrylate or dimethacrylate, for example a polyethylene glycol dimethacrylate with an average molecular weight of approximately 600.

The photopolymer composition may include a polymerisable comonomer. The polymerisable comonomer(s) may be selected to improve the properties and/or processability of the cross-linkable polymeric casting composition. The polymerisble comonomer may be a low viscosity comonomer. The comonomer may be selected from one or more of aromatic olefins, polymerisable bisphenol monomers capable of forming a homopolymer having a high refractive index of more than 1.55, urethane monomers having 2 to 6 terminal acrylic or methacrylic groups, and thiodiacrylate or dimethacrylate monomers. The most preferred comonomers are diallyl terephthalate, diallyl isophthalate, and polyethylene glycol monomethylacrylate.

The photopolymer composition may and preferably will include an aromatic olefin. The aromatic olefins may be selected from styrene, divinyl benzene and 3,9-divinyl-2,4, 8,10-tetraoxaspiro [5.5] undecane (DTU). The aromatic olefins may be present in amounts of approximately 5 to 50% by weight.

The fluid polymerisable composition preferably include one or more monomers selected from the group of
a) polyoxyalkylene glycol diacrylate or dimethylacrylate;
b) bis-ethylenically unsaturated bisphenol monomer;
c) urethane acrylate or methacrylate monomers having 2 to six unsaturated terminal groups selected from acrylate and methacrylate;
d) cross linking monomers containing at least three unsaturated groups selected from allyl, acrylate and methacrylate; and
e) a polyol allyl carbonate monomers generally containing two to 5 allyl carbonate groups.

The more preferred compositions comprise
a) a polyoxyalkylene diacrylate or dimethacrylate; preferably in an amount of from 20 to 80% (more preferably 30 to 70%) by weight;
b) bis ethylenically unsaturated bisphenol monomer preferably in an amount of 20 to 75% (more preferably 40 to 60%) by weight;
c) optionally an urethane acrylate monomer having from 2 to 6 terminal unsaturated groups preferably in an amount of 0 to 35%; and
d) optionally a cross linking agent such as a polyol substituted with at least three acrylate groups preferably in an amount of up to 40% by weight.

The most preferred polymerisable composition are the compositions disclosed in U.S. Pat. Nos. 4,912,185 and 5,373,033 (Toh et al) which are herein incorporated by reference.

The polyoxy alkylene glycol diacrylate or dimethacrylate compound according to the present invention may include ethylene oxide or propylene oxide repeating units in its backbone. A polyethylene glycol dimethacrylate is preferred. One suitable material is that sold under the trade name NK ESTER 9G by Shin Nakamura. Alternatively, an NK Ester 6G, 4G or 14G may be used.

The polyoxy alkylene glycol diacrylate or dimethacrylate component may be present in amounts of from approximately 20% by weight to 80% by weight based on the total weight of the casting composition.

The high index bisphenol monomer component in the cross-linkable casting composition may be selected from: dimethacrylate and diacrylate esters of bisphenol A; dimethacrylate and diacrylate esters of 4,4'bishydroxyethoxy-bisphenol A and the like. The high index bisphenol monomer may be present in amounts of from approximately 20 to 75% by weight, preferably 30 to 70% by weight, based on the total weight of the casting composition.

The cross-linkable polymeric casting composition may include a urethane monomer having 2 to 6 terminal acrylic and/or methacrylic groups. Suitable materials falling within this definition include materials supplied under the trade names U-4H, U-4HA and U-6HA by Shin Nakamura.

The urethane monomer may be present in amounts of from approximately 0% to approximately 35% by weight, preferably 5% by weight, based on the total weight of the casting composition.

In a preferred aspect of the present invention the cross-linkable polymeric coating composition may further include at least one poly-functional unsaturated cross-linking agent.

The polyfunctional unsaturated cross-linking agent according to the present invention may be a tri- or tetra-functional vinyl, an acrylic or methacrylic monomer. The cross-linking agent may be a short chain monomer for example trimethylol propane trimethacrylate, pentaerythritol triacrylate or tetracrylate, or the like. Other polyfunctional cross-linking agents which may be used include NK Ester TMPT, NK Ester A-TMPT, NK Ester A-TMM-3, NK Ester A-TMMT, di-trimethylol propane tetraacrylate, trimethylolpropane triacrylate, pentaerylthritrol tetramethacrylate, dipentaerythritol monohydroxypenta acrylate, pentaerylthritol triacrylate, ethoxylated trimethylolpropane triacrylate, ethoxylated trimethylolpropane trimethacrylate.

The polyfunctional unsaturated cross-linking agent may be present in amounts of from approximately 5 to 45% by weight, preferably approximately 30 to 40% by weight based on the total weight of the casting composition.

The cross-linkable casting composition may further include a co-reactant including a polythiol.

Further examples of a fluid polymersable composition suitable for use in the invention are high index/high ABBE No. compositions of U.S. Pat. No. 6,166,158.

The photochromic substance may be chosen from a range of known chemical classes anthraquinones, phthalocyanines, spiro-oxazines chromenes, pyrans and fulgides. Naphthopyrans and oxazines are preferred. Specific examples of photochromic substances are disclosed in WO95/10790, U.S. Pat. No. 5,763,511, WO98/16863 and U.S. Pat. No. 6,022,497.

The photochromic substance may be applied to the surface of the substrate as a solution in a suitable solvent or carrier. The solvent or carrier may then be removed, for example by evaporation, to provide a layer of photochromic material on the surface into which the photochromic material is to be imbibed.

In accordance with the above the invention further provides a partly cured transparent article for preparation of a photochromic article comprising a partly cured polymeric article comprising an unsaturated monomer and/or and a thermal polymerisation initiator.

The activation and fade kinetics and relationship with hardness is illustrated for one type of lens in the attached drawing. The Barcol scale is a relative hardness scale determined by an in house method.

Referring to the drawings

Figure 1:
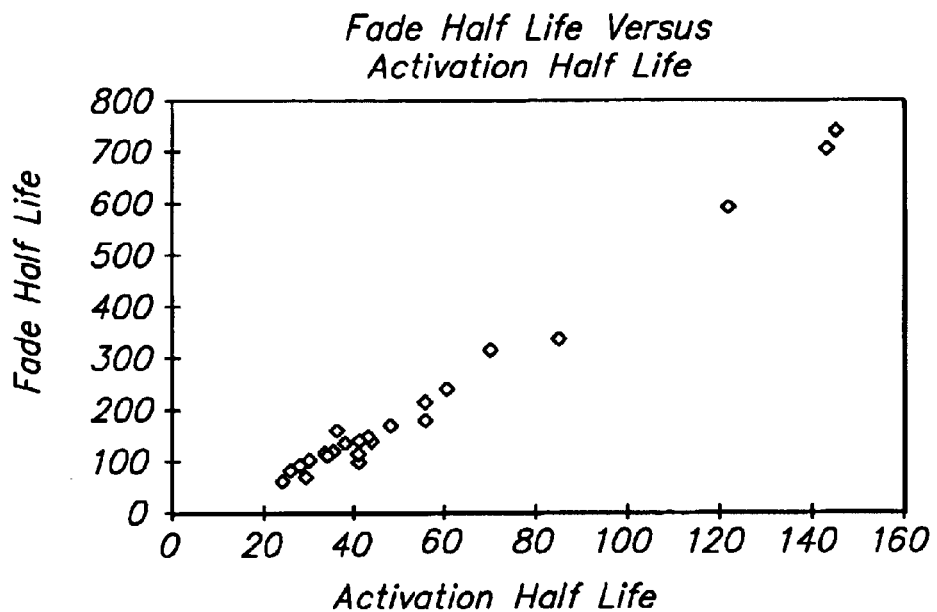
FIG. 1 is graph of fade half life and activation half life.

Referring to FIG. 1, which shows a plot of the fade half life (the time for the optical density to fade to half of the initial darkened value) against the activation half life (the time for the optical density to increase to half of the final, saturation value) there is a clear relationship between fade half life and activation half life.

Figure 2:
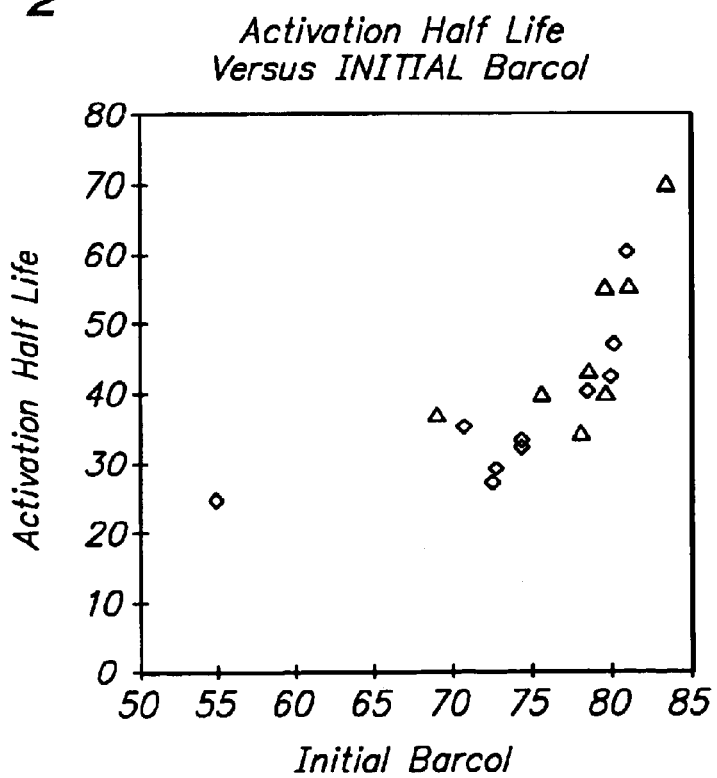
FIG. 2 is a graph of the variation of activation half life with Barcol hardness.

Barcol is a measurement of hardness and is indicative of the degree of polymerisation and crosslinking in the formulation. It can be seen from FIG. 2 that as Barcol increases, the activation half life increases by a strongly non-linear response.

The photochromic substance may be brought into contact with the polymer composition of this lens which has been subjected to a first curing step to provide a Barcol hardness in the article of intermediate hardness which is in the range of from 55 to 70 and more preferably from 55 to 68. Following incorporation the photochromic dye the further curing stage may provide a Barcol hardness in the range of from 68 to 90 more preferably from 70 to 85.

Without wishing to be bound by theory we consider that the surprising improvement in the rate of activation and rate of fading when the photochromic materials are introduced to a partially cured polymer substrate may be due to an increased localised free volume. These localized free volumes are retained during the further cure while the article is hardened.

As these photochromic substances are incorporated into polymers, especially highly crosslinked polymers, the rate of activation and fading become dependent on the "free volume" of the lens. In the conventional crosslink lens the crosslink density for a lens increases, there is less volume to allow the dye to change configuration and hence, the activation and fade kinetics are slower than in a high free volume state. In the process of the invention we have found that imbibing an article of intermediate hardness with the photochromic substance allows the high free volume of resin contacting the molecules of photochromic material to be maintained while the lens is fully cured. Typically, there is a relationship between the activation and fade kinetics, such that the fade kinetics may be 3–10 times longer (preferably 5 to 10 times) than the activation kinetics.

The invention will now be described with reference to the following examples. It is to be understood that the examples are provided by way of illustration of the invention and that they are in no way limiting to the scope of the invention.

EXAMPLES

Compositions shown in Table 1 below were prepared using the component shown in the amounts by weight specified.

The compositions were moulded between upper and lower lens mould sections with a separating washer.

The compositions were photopolymerised and provided the initial Barcol hardness shown in Table 2. Photochromic material was contacted with the surface of the photopolymerised material which was heated in a temperature of about 130 to 135° C. to produce thermal polymerisation in the compositions of Examples 2–5 and imbibition of the photochromic dye.

TABLE 1

| Example | NS110 | 9G | 14G | U-4HA | DATP | M90G | Vicure 55 | DHBP | Amine additive |
|---|---|---|---|---|---|---|---|---|---|
| 1 | 50 | 45 | — | 5 | — | — | 0.15 | — | — |
| 2 | 50 | 45 | — | 5 | — | — | 0.1 | 0.1 | 0.06 |
| 3 | 50 | 10 | 30 | 10 | — | — | 0.03 | 0.1 | 0.1 |
| 4 | 50 | 45 | — | — | 5 | — | 0.15 | 0.1 | — |
| 5 | 50 | 40 | — | — | — | 5 | 0.15 | 0.1 | 0.001 |

NS110: bisphenol A ethoxylated dimethacrylate (monomer supplied by Akzo Chemie)
9G and 14G: polyethylene glycol dimethacrylate by Shin Nakamura
U-4HA: urethane monomer having 2–6 terminal acrylic or methacrylic groups by Shin Nakamura
DATP: diallyl terephthalate
M90G: polyethylene glycol monomethacrylate
Vicure 55: (photoinitiator) methyl phenyl glyoxylate
DHBP: 2,5 dimethyl 2,5 di(tertbutyl peroxy) hexane The darkening and fading rate of the lenses was compared when exposed to ultraviolet light and shows that the compositions of the invention provide a significant improvement in the rate of darkening when exposed to ultraviolet light and the rate of fading when removed from the ultraviolet light.

TABLE 2

| Example | $T_{1/2}$ darkening (secs) | $T_{1/2}$ fading (secs) | Optical Density (O.D.) | Initial Barcol Hardness | Final Barcol Hardness |
|---|---|---|---|---|---|
| Example 1 (comparative) | 40 | 115 | 0.56 | 80 | 80 |
| Example 2 | 27 | 93 | 0.78 | 73 | 79 |
| Example 3 | 19 | 61 | 0.78 | 59 | 70 |
| Example 4 | 29 | 90 | 0.79 | 68 | 70 |
| Example 5 | 24 | 75 | 0.79 | 67 | 70 |

Barcol Hardness may be determined in accordance with ASTM D2583 95 and measured at 20° C.
$T_{1/2}$ and optical density were measured at 23° C.

TABLE 4

| Example | $T_{1/2}$ Darkening (secs) | $T_{1/2}$ Fading (secs) | Optical Density | Initial Barcol hardness | Final Barcol hardness |
|---|---|---|---|---|---|
| Example 6 | 35 | 95 | 0.81 | 64 | 72 |
| Example 7 | 33 | 95 | 0.79 | 67 | 73 |
| Example 8 | 31 | 105 | 0.88 | 60 | 70 |
| Example 9 | 26 | 70 | 0.80 | 63 | 70 |
| Example 10 | 32 | 95 | 0.80 | 66 | 74 |
| Example 11 | 27 | 70 | 0.80 | 62 | 70 |
| Example 12 | 23 | 53 | 0.79 | 56 | 64 |
| Example 13 | 22 | 53 | 0.70 | 33 | 68 |
| Example 14 | 28 | 78 | 0.71 | 56 | 72 |
| Example 15 | 25 | 65 | 0.72 | 33 | 64 |
| Example 16 | 23 | 54 | 0.72 | 37 | 61 |
| Example 17 | 18 | 47 | 0.69 | 43 | 61 |

TABLE 3

| Example | NS110 | 9G | 14G | U-4HA | DATP | DAIP | CR-39 | Vicure 55 | Lucirin TPO | Terpinolene | DHBP |
|---|---|---|---|---|---|---|---|---|---|---|---|
| Example 6 | 43 | 45 | 0 | 5 | 7 | 0 | 0 | 0.20 | 0 | 0 | 0.1 |
| Example 7 | 45 | 45 | 0 | 5 | 5 | 0 | 0 | 0.15 | 0 | 0 | 0.1 |
| Example 8 | 55 | 30 | 0 | 5 | 0 | 10 | 0 | 0.15 | 0 | 0 | 0.1 |
| Example 9 | 48 | 27 | 20 | 0 | 5 | 0 | 0 | 0.15 | 0 | 0 | 0.1 |
| Example 10 | 50 | 40 | 0 | 5 | 0 | 0 | 5 | 0.15 | 0 | 0 | 0.1 |
| Example 11 | 48 | 27 | 20 | 0 | 5 | 0 | 0 | 0 | 0.0525 | 0 | 0.1 |
| Example 12 | 48 | 27 | 20 | 0 | 5 | 0 | 0 | 0 | 0.025 | 0 | 0.1 |
| Example 13 | 53 | 47 | 0 | 0 | 0 | 0 | 0 | 0 | 0.0525 | 0.05 | 0.5 |
| Example 14 | 70 | 25 | 0 | 0 | 5 | 0 | 0 | 0 | 0.0525 | 0.06 | 0.25 |
| Example 15 | 70 | 25 | 0 | 0 | 5 | 0 | 0 | 0 | 0.0525 | 0.08 | 0.25 |
| Example 16 | 53 | 47 | 0 | 0 | 0 | 0 | 0 | 0 | 0.0525 | 0.0375 | 0.25 |
| Example 17 | 53 | 0 | 47 | 0 | 0 | 0 | 0 | 0 | 0.0525 | 0.025 | 0.25 |

DAIP-diallyliso phthalate

TABLE 5

| Example | NS110 | 9G | 14G | DATP | Lucirin TPO | Terpinolene | DHBP | Initial Barcol | Initial conversion | Final Barcol | Final conversion |
|---|---|---|---|---|---|---|---|---|---|---|---|
| Example 18 | 70 | 25 | 0 | 5 | 0.0525 | 0.04 | 0.25 | 63 | 71% | 72 | 89% |
| Example 19 | 70 | 25 | 0 | 5 | 0.0525 | 0.06 | 0.25 | 56 | 68% | 69 | 89% |
| Example 20 | 70 | 25 | 0 | 5 | 0.0525 | 0.08 | 0.25 | 33 | 67% | 64 | 89% |
| Example 21 | 53 | 47 | 0 | 0 | 0.0525 | 0.0125 | 0.25 | 69 | 83.6% | 74 | 95.8% |
| Example 22 | 53 | 47 | 0 | 0 | 0.0525 | 0.025 | 0.25 | 60 | 77.1% | 68 | 94.4% |
| Example 23 | 53 | 47 | 0 | 0 | 0.0525 | 0.0375 | 0.25 | 37 | 69.9% | 61 | 93.7% |
| Example 24 | 53 | 0 | 47 | 0 | 0.0525 | 0.0125 | 0.25 | 60 | 87.3% | 65 | 96.8% |
| Example 25 | 53 | 0 | 47 | 0 | 0.0525 | 0.025 | 0.25 | 43 | 80.3% | 61 | 95.7% |
| Example 26 | 53 | 0 | 47 | 0 | 0.0525 | 0.0375 | 0.25 | 23 | 76.8% | 57 | 95.2% |

Examples 27 to 33

Examples 27 to 33 demonstrate the use of a relatively low temperature thermal initiator (TBPEH) to provide an article of Intermediate hardness and a relatively high temperature thermal initiator to provide further cure during imbibition of the photochromic substance.

TABLE 6

(thermally cured formulations)

| Example | NS110 | 9G | 14G | U-4HA | DATP | EBPADA | M90G | TBPEH | Nofmer | Terpinolene | DHBP |
|---|---|---|---|---|---|---|---|---|---|---|---|
| Example 27 | 65 | 0 | 15 | 0 | 0 | 0 | 0 | 1.0 | 0 | 0.5 | 0.2 |
| Example 28 | 50 | 0 | 45 | 0 | 0 | 0 | 5 | 1.0 | 0 | 0.5 | 0.2 |
| Example 29 | 65 | 45 | 0 | 0 | 0 | 0 | 0 | 1.0 | 0 | 1.0 | 0.2 |
| Example 30 | 35 | 0 | 40 | 0 | 0 | 25 | 0 | 1.0 | 0 | 0.5 | 0.2 |
| Example 31 | 48 | 27 | 20 | 0 | 5 | 0 | 0 | 1.0 | 0 | 0.5 | 0.2 |
| Example 32 | 50 | 10 | 30 | 10 | 0 | 0 | 0 | 1.0 | 0 | 0.5 | 0.2 |
| Example 33 | 65 | 0 | 35 | 0 | 0 | 0 | 0 | 1.0 | 5 | 0 | 0.2 |

EBPADA = Ethoxylated bis-Phenol A Diacrylate

TABLE 6a (optical bench data)

| Example | $T_{1/2}$ Darkening (secs) | $T_{1/2}$ Fading (secs) | Optical Density | Initial Barcol hardness | Final Barcol hardness |
|---|---|---|---|---|---|
| Example 27 | 25 | 68 | 0.72 | 66 | 75 |
| Example 28 | 22 | 59 | 0.71 | 60 | 72 |
| Example 29 | 24 | 60 | 0.88 | 63 | 76 |
| Example 30 | 23 | 55 | 0.70 | 63 | 74 |
| Example 31 | 20 | 50 | 0.71 | 60 | 72 |
| Example 32 | 22 | 53 | 0.70 | 58 | 76 |
| Example 33 | 26 | 68 | 0.72 | 67 | 76 |

It is to be understood that the invention described hereinabove is susceptible to variations, modifications and/or additions other than those specifically described and that the invention includes all such variations, modifications and/or additions which fall within the spirit and scope of the above description.

What is claimed is:

1. A process for manufacture of a photochromic article comprising:
   providing a fluid polymerizable composition;
   subjecting the fluid polymerizable composition to a first curing step to provide a solid article of intermediate hardness wherein the solid article of intermediate hardness has a double bond conversion of from 67% to 87.3% with reference to the double bonds in the fluid polymerizable composition;
   contacting the solid article of intermediate hardness with a photochromic substance; and
   subjecting the solid article of intermediate hardness to a further curing step to increase the hardness and provide a polymeric article imbibed with the photochromic substance.

2. A process according to claim 1 wherein the solid article of intermediate hardness has a double bond conversion of from 70 to 85% with reference to the double bonds in the fluid polymerizable composition.

3. A process according to claim 2 wherein the the solid article of intermediate hardness has a double bond conversion of at least 88% with reference to double bonds in the fluid polymeric composition.

4. A process according to claim 1 wherein the fluid polymerizable composition includes a thermal polymerization initiator for the further curing step and the first curing step includes subjecting the fluid polymerizable composition to radiation or thermal curing and wherein the further curing step comprises heating the solid article of intermediate hardness to a temperature sufficient to activate the thermal polymerization initiator and to provide thermal polymerization.

5. A process according to claim 4 wherein the further polymerization step is conducted at a temperature in the range of from 100 to 180° C.

6. A process according to claim 4 wherein in the step of further heating the solid article of intermediate hardness simultaneously produces both further curing and imbibation of the photochromic substance.

7. A process according to claim 4 wherein the further polymerization step is conducted at a temperature in the range of from 120 to 150° C.

8. A process according to claim 1 wherein the fluid polymeric composition comprises an organic monomer component comprising at least two unsaturated groups selected from acrylate, methacrylate and allyl groups.

9. A process according to claim 8 wherein the fluid polymerizable composition includes at least one polyfunctional acrylate and/or polyfunctional methacrylate monomer.

10. A process according to claim 1 wherein the fluid polymerizable composition includes a network modifier selected from the group consisting of tertiary amines; chain transfer agent; allylic monomers; monounsaturated compounds and mixtures thereof.

11. A process according to claim 10 wherein the network modifier is present in an amount of no more than 10% by weight of the total composition and is selected from tertiary amines, chain transfer agents, allylics and monounsaturated compounds.

12. A process according to claim 10 wherein the network modifier is selected from the group consisting of (a) amine; (b) Michael addition products of amines and monomers comprising one or more acrylate and/or methacrylate groups; (c) hindered amine light stabilizers; (d) transfer agent; and (e) monofunctional acrylates and/or methacrylates comprising a flexible chain of at least four carbon atoms.

13. A process for manufacture of a photochromic article comprising:
providing a fluid polymerizable composition;
subjecting the fluid polymerizable composition to a first curing step to provide a solid article of intermediate hardness wherein the solid article of intermediate hardness;
contacting the solid article of intermediate hardness with a photochromic substance;
subjecting the solid article of intermediate hardness to a further curing step to increase the hardness and provide a polymeric article imbibed with the photochromic substance and wherein the fluid polymerizable composition includes a network modifier selected from the group consisting of N-(loweralkyl)diethanolamines, tri (loweralkyl)amines, and unsaturated tertiary amines.

14. A process according to claim 12 wherein the chain transfer agent is selected from the group consisting of mercaptans, allylic, styrene derivatives, terpinolene and mixtures thereof.

15. A process according to claim 1 wherein the fluid polymerizable composition includes at least two initiators including a first initiator for activation in the first cure step and a second initiator for activation in the second curing step wherein the second initiator remains substantially unactivated during the first curing step and is activated to provide further curing in the presence of the photochromic substance.

16. A process according to claim 1 wherein the fluid polymerizable composition includes a photoinitiator for the first curing step and a thermal polymerization initiator for the further curing step and wherein the first curing step includes photopolymerization of the fluid polymerizable composition and the second curing step includes heating the article to a temperature sufficient to activate the thermal polymerization initiator.

17. A process according to claim 16 wherein the photoinitiator include a benzoin ether or acylphosphine oxide.

18. A process for manufacture of a photochromic article comprising:
providing a fluid polymerizable composition;
subjecting the fluid polymerizable composition to a first curing step to provide a solid article of intermediate hardness;
contacting the solid article of intermediate hardness with a photochromic substance;
subjecting the solid article of intermediate hardness to a further curing step to increase the hardness and provide a polymeric article imbibed with the photochromic substance;
and wherein the fluid polymerizable composition includes at least two thermal polymerization initiators including a first thermal polymerization initiator which is activated at a relatively low temperature and a second thermal polymerization initiator which is activated at a relatively high temperature and wherein the first curing step includes heating the fluid polymerizable composition to a temperature sufficient to activate the first thermal polymerization initiator and insufficient to provide significant activation of the second thermal polymerization initiator and the further curing step includes heating the solid article to a temperature higher than the first curing step and sufficient to activate the second thermal polymerization initiator.

19. A process according to claim 18 wherein the 10 hour half life of said second thermal polymerization initiator is at least 20° C. greater than the 10 hour half life of said first thermal polymerization initiator.

20. A process according to claim 18 wherein the second thermal polymerization initiator is selected from the group consisting of t-butyl benzoate, dicumyl peroxide, 2,5-dimethyl hexane, 2,5-di-t-butyl peroxide, dibutyl peroxide, cumen hydroperoxide and mixture thereof.

21. An optical article formed by a process according to claim 1.

22. An optical article comprising a partly cured polymerizable composition comprising a polymerization initiator for completing curing of the article during imbibition of a photochromic substance wherein the polymerization initiator is a thermal polymerization initiator having a 10 hour half life of more than 100° C.

23. A process for manufacture of a photochromic article comprising:
providing a fluid polymerizable composition;
subjecting the fluid polymerizable composition to a first curing step to provide a solid article of intermediate hardness wherein the article is cast in a mould and the solid article of intermediate hardness has sufficient integrity to be removed from the mould without deforming;
contacting the solid article of intermediate hardness with a photochromic substance; and
subjecting the solid article of intermediate hardness to a further curing step to increase the hardness and provide a polymeric article imbibed with the photochromic substance.

* * * * *